US007967231B2

(12) United States Patent
Post et al.

(10) Patent No.: US 7,967,231 B2
(45) Date of Patent: Jun. 28, 2011

(54) BALE PROCESSING APPARATUS

(75) Inventors: Grant E. Post, Rock Valley, IA (US); Gregory D. Dejager, Rock Rapids, IA (US)

(73) Assignee: Bale Buckets, Inc., Rock Valley, IA (US)

( * ) Notice: Subject to any disclaimer, the term of this patent is extended or adjusted under 35 U.S.C. 154(b) by 0 days.

(21) Appl. No.: 12/221,601

(22) Filed: Aug. 5, 2008

(65) Prior Publication Data

US 2010/0032508 A1 Feb. 11, 2010

(51) Int. Cl.
B02C 19/00 (2006.01)
(52) U.S. Cl. .................. 241/277; 241/101.762; 241/605
(58) Field of Classification Search .................. 241/605, 241/189.1, 73, 186.4, 101.761, 101.763, 241/101.72, 101.77, 277, 101.762
See application file for complete search history.

(56) References Cited

U.S. PATENT DOCUMENTS

| 926,241 A * | 6/1909 | Chesebro ................... 366/183.1 |
| 2,792,183 A * | 5/1957 | Fasching et al. ............. 241/277 |
| 3,051,398 A * | 8/1962 | Babb ............................ 241/136 |
| 3,612,127 A * | 10/1971 | Benno ............................. 83/808 |
| 3,999,674 A | 12/1976 | Meitl |
| 4,088,272 A | 5/1978 | Grillot |
| 4,381,082 A * | 4/1983 | Elliott et al. ................ 241/186.5 |
| 4,411,573 A | 10/1983 | Townsend |
| 4,597,703 A * | 7/1986 | Bartolini ....................... 414/24.6 |
| 4,830,292 A | 5/1989 | Frey |
| 4,919,344 A * | 4/1990 | McKie ............................. 241/32 |
| 4,923,128 A | 5/1990 | Ostrowski |
| 4,951,883 A * | 8/1990 | Loppoli et al. ......... 241/101.762 |
| 5,033,683 A | 7/1991 | Taylor |
| 5,090,630 A | 2/1992 | Kopecky |
| 5,242,121 A | 9/1993 | Neier |
| 5,340,040 A | 8/1994 | Bussier |
| 5,542,326 A | 8/1996 | Borgford |
| 5,544,822 A | 8/1996 | Neier |
| 5,593,096 A * | 1/1997 | Harker et al. .................... 241/14 |
| 6,431,480 B1 | 8/2002 | Hruska |
| 6,481,653 B2 * | 11/2002 | Hruska ........................ 241/189.1 |
| 6,923,393 B1 * | 8/2005 | Neier et al. ....................... 241/30 |

* cited by examiner

Primary Examiner — Mark Rosenbaum
(74) Attorney, Agent, or Firm — Jeffrey A. Proehl; Woods, Fuller, Shultz & Smith, PC

(57) ABSTRACT

A bale processing apparatus for receiving and shredding a bale of material is disclosed. The bale processing apparatus comprises a hopper having a top and a bottom, a top opening through which a bale is received into the hopper and a bottom opening through which the material of the bale is dispersed. The bottom opening is at least partially positioned below the top opening. The apparatus further includes a bale shredding assembly for removing material from a bale received in the hopper. The bale shredding assembly is located in the interior of the hopper below the top opening and above the bottom opening.

16 Claims, 4 Drawing Sheets

BALE PROCESSING APPARATUS

BACKGROUND OF THE INVENTION

1. Field of the Invention

The present invention relates to bale handling systems and more particularly pertains to a new bale processing apparatus for removing baled material from a bale in a simple and compact and portable manner that allows easy placement of the removed material.

2. Description of the Prior Art

The use of bale handling systems is known, and some of these known systems are designed to remove material from the bale and disperse or distribute the removed material. The known systems tend to be complex and bulky machines that as a result tend to be difficult to manufacture and expensive to purchase, and also tend to be difficult to use in tight quarters, such as when the material from the bale is to be placed in animal pens for bedding or in feed bunks for feed.

In these respects, the bale handling systems according to the present invention substantially departs from the conventional concepts and designs of the prior art, and in so doing provides an apparatus primarily developed for the purpose of removing baled material from a bale in a simple and compact and portable manner that allows easy placement of the removed material.

SUMMARY OF THE INVENTION

In view of the foregoing disadvantages inherent in the known types of bale handling systems now present in the prior art, the present invention provides a new bale processing apparatus construction wherein the same can be utilized for removing baled material from a bale in a simple and compact and portable manner that allows easy placement of the removed material.

To attain this, the present invention generally comprises a bale processing apparatus for receiving and shredding a bale of material. The bale processing apparatus comprises a hopper having a top, a bottom, a top opening through which a bale is received into the hopper, and a bottom opening through which the material of the bale is dispersed. The bottom opening is at least partially positioned below the top opening. The bale processing apparatus may also include a bale shredding assembly for removing material from a bale received in the hopper. The bale shredding assembly may be located in the interior of the hopper below the top opening and above the bottom opening.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
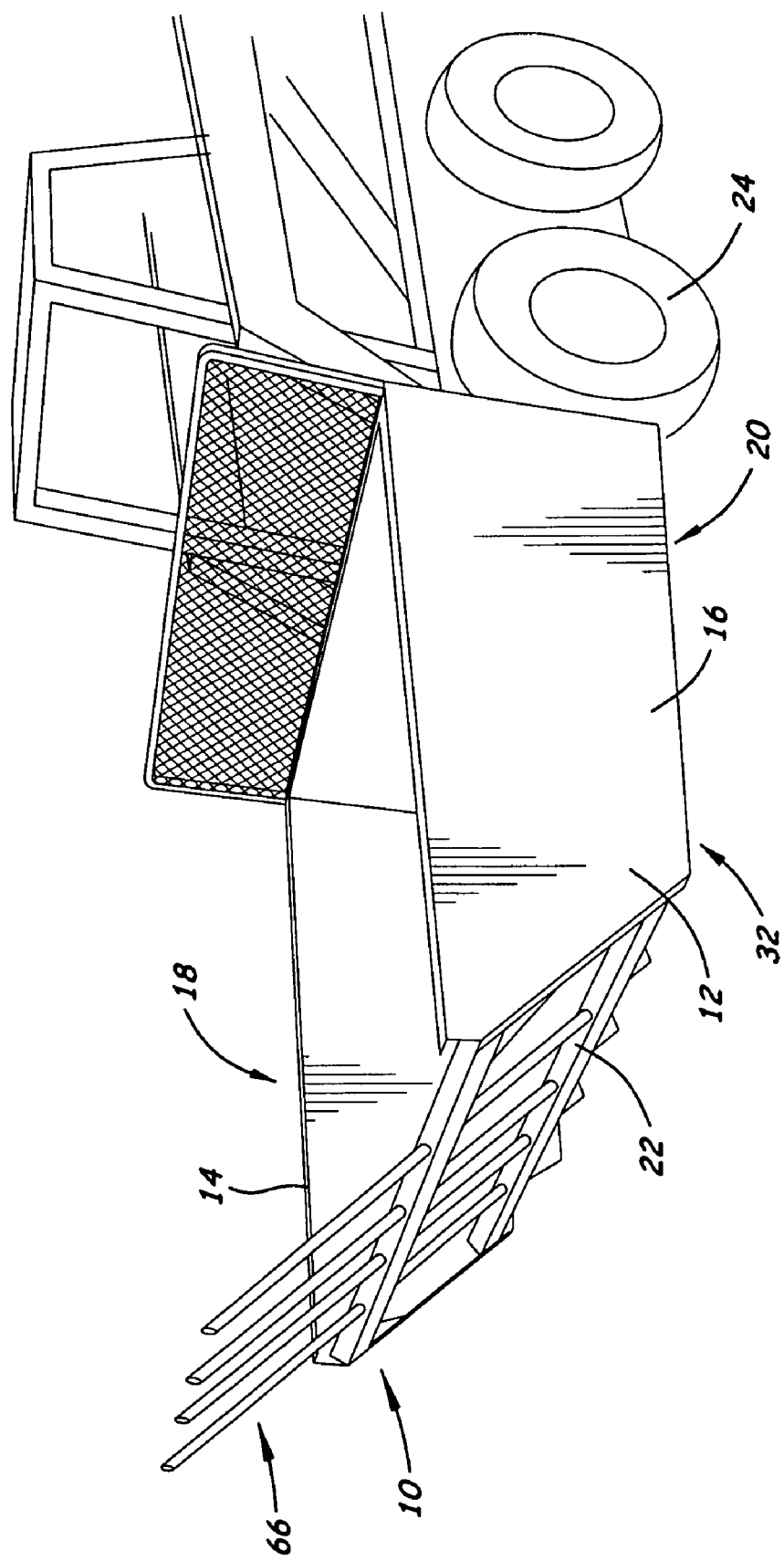
FIG. 1 is a schematic perspective view of the bale processing apparatus of the disclosure.
Figure 2:
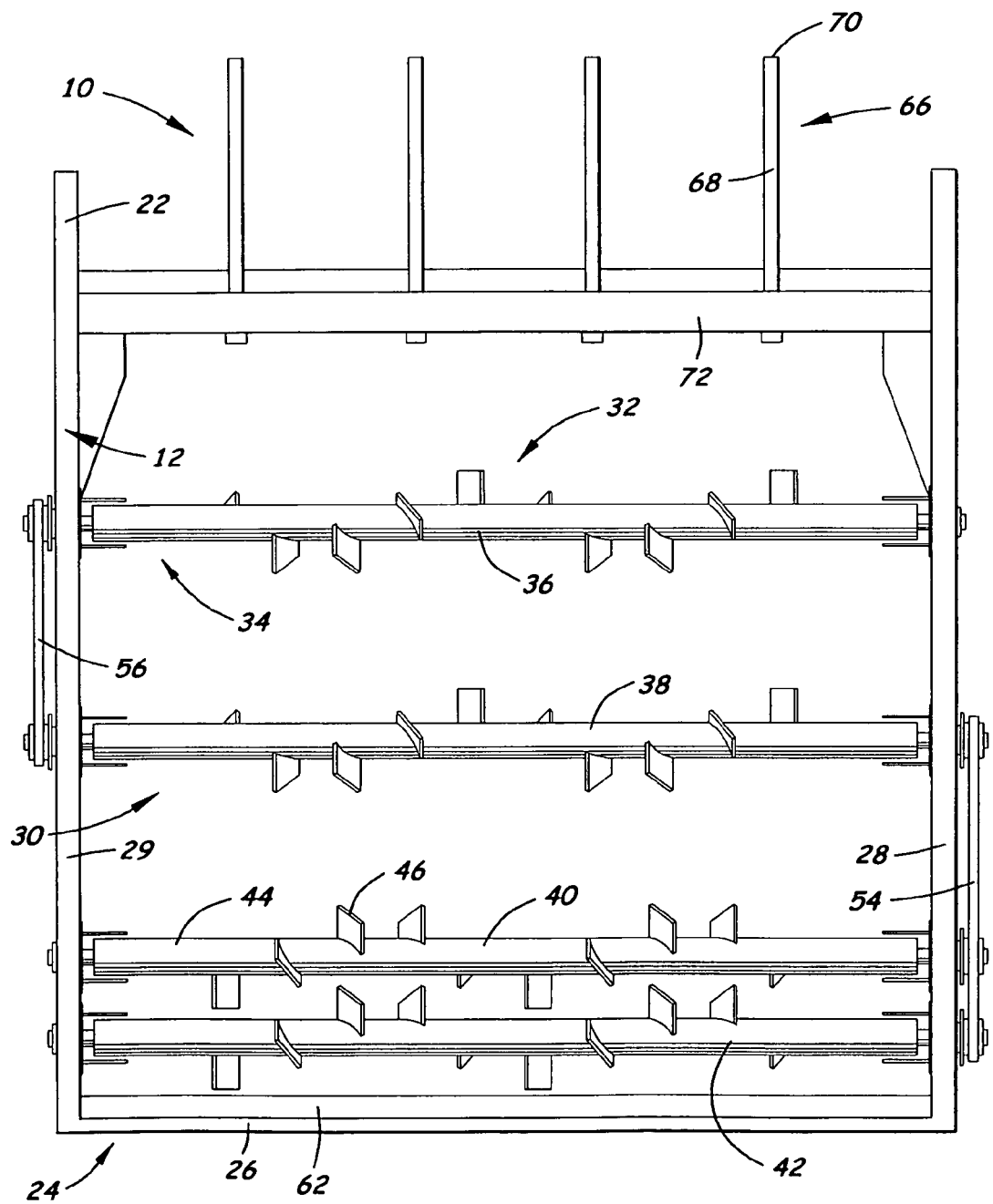
FIG. 2 is a schematic top view of the bale processing apparatus of the disclosure.
Figure 3:
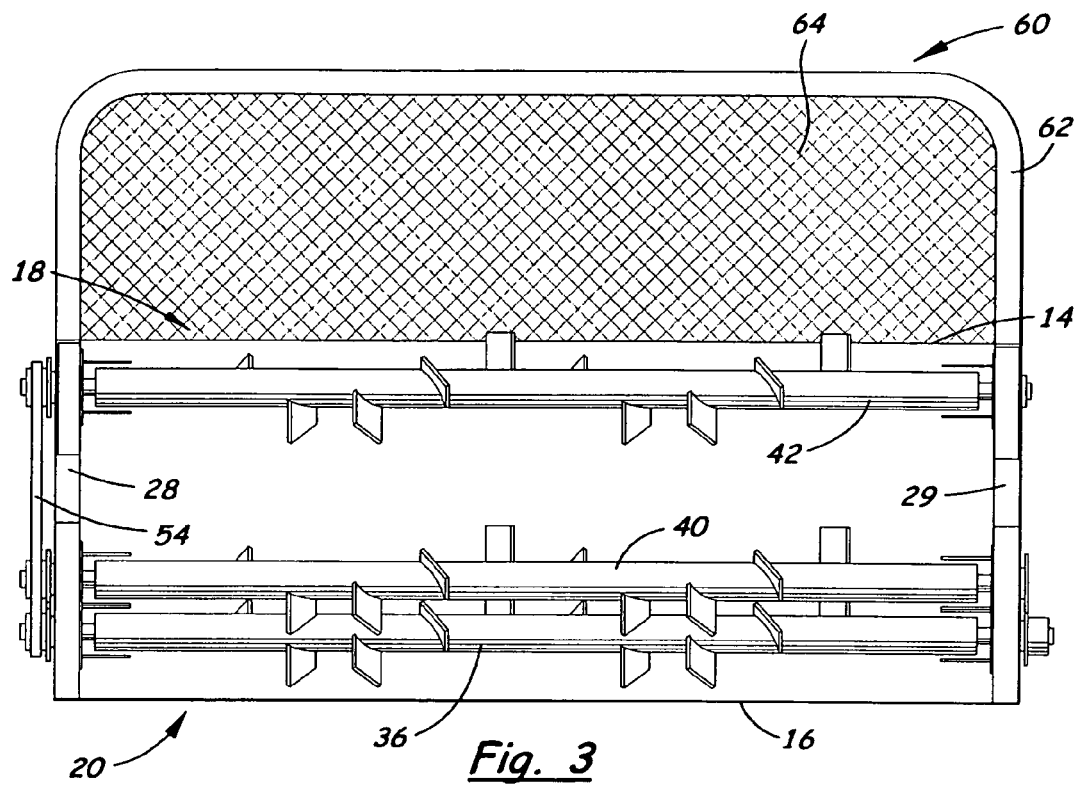
FIG. 3 is a schematic rear view of the bale processing apparatus of the disclosure with the rear wall of the hopper and the bale engaging assembly removed to reveal detail.
Figure 4:
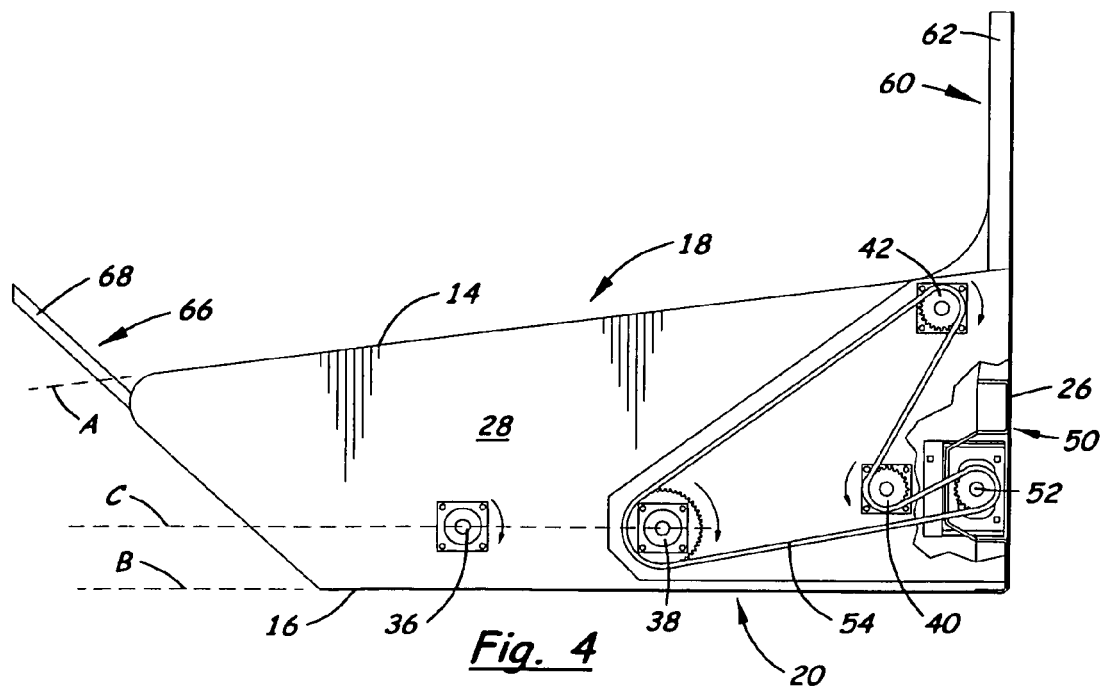
FIG. 4 is a schematic right side view of the bale processing apparatus of the disclosure, with a portion of a side wall of the hopper broken away to reveal the motor of the drive system.
Figure 5:
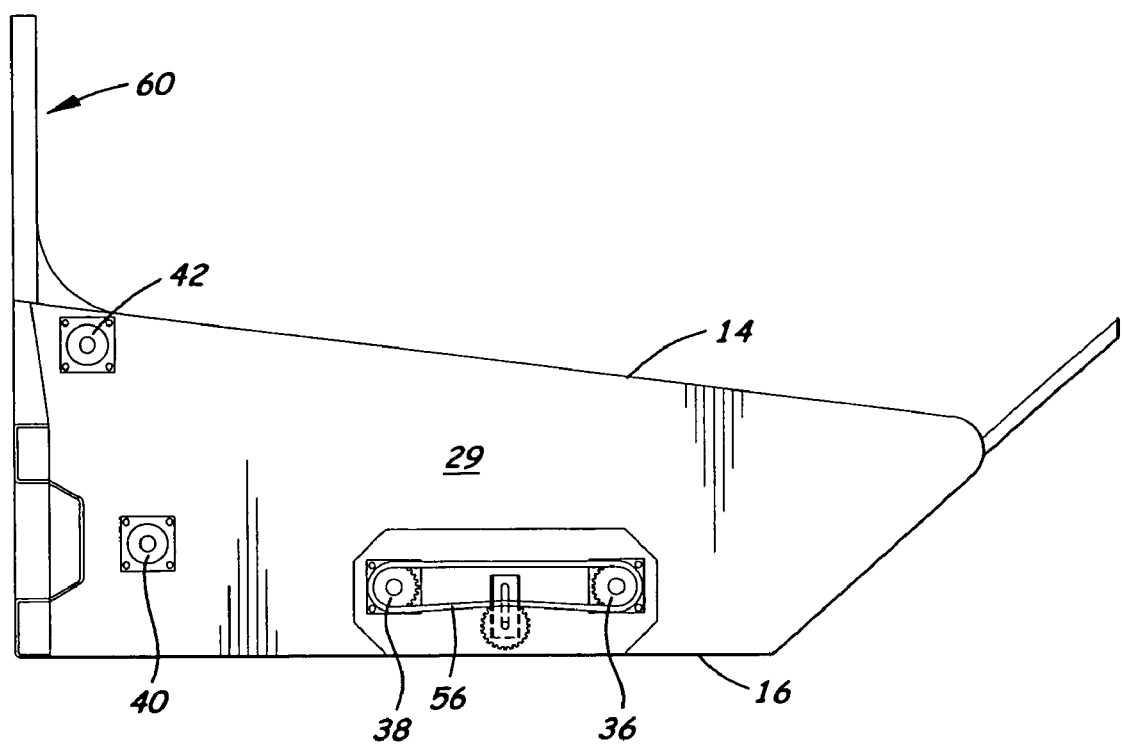
FIG. 5 is a schematic left side view of the bale processing apparatus of the disclosure.

With reference now to the drawings, and in particular to FIGS. 1 through 5 thereof, a new bale processing apparatus embodying the principles and concepts of the present invention and generally designated by the reference numeral 10 will be described.

The disclosure is directed to a bale processing apparatus 10 which is highly suitable for receiving and shredding a bale 1 of material. The apparatus 10 is highly effective for processing round or cylindrically-shaped bales, although the invention is not limited to processing one size or shape of bale. The apparatus is suitable for processing virtually any material that is baled and needs to be removed from the bale for use.

In illustrative embodiments, the bale processing apparatus 10 includes a hopper 12, and the hopper has a top 14 which is positioned relatively above and higher than a bottom 16 of the hopper when the bottom of the hopper is rested on a ground surface. The hopper 12 may have a top opening 18 through which a bale 1 is received into the hopper 12, and a bottom opening 20 through which the material of the bale 1 is dispersed. It should be recognized that a bale may not, and need not, fit completely in the hopper, and the bale may protrude significantly from the top of the hopper when the bale is inserted in the hopper and while the bale is being processed. The top opening 18 is located at the top 14 of the hopper and the bottom opening 20 is located at the bottom 16 of the hopper, and the top opening may be positioned above the bottom opening. The bottom opening 20 may be at least partially positioned below the top opening 18, which facilitates a substantially vertical flow of the bale (and the baled material) through the hopper 12 under the influence of gravity.

The hopper 12 may have a front 22 and a rear 24, with the rear 24 generally being oriented toward the vehicle when the bale processing apparatus is mounting on the vehicle. In some embodiments, the hopper 12 tapers smaller in cross sectional size (in a substantially horizontal plane) from the top 14 to the bottom 16 to help guide the baled material as it is processed.

The hopper 12 of the bale processing apparatus 10 may comprise a rear wall 26 and a pair of side walls 28, 29 that each extend forwardly from the rear wall 26 to define an interior 30 of the hopper. The side walls 28, 29 may be laterally spaced from each other to extend on either side of the interior. An area or overall size of the top opening 18 may be relatively greater than an area of the bottom opening 20. The top opening 18 (or the edges of the walls that form the top opening) may lie substantially in a first plane (A), and the bottom opening 20 (or the edges of the walls that form the bottom opening) may lie substantially in a second plane (B). In some embodiments, the first plane may be inclined with respect to the second plane when the bottom 16 of the hopper is rested upon a ground surface, and the first plane may be inclined in a forward direction.

The bale processing apparatus 10 may also include a bale shredding assembly 32 for removing material from a bale 1 that is received in the hopper 12. The bale shredding assembly 32 may be located in the interior 30 of the hopper 12. The bale shredding assembly 32 may be located toward the bottom 16 of the hopper, or at least closer to the bottom 16 than the top 18.

The bale shredding assembly 32 may include a plurality of rotating structures 34. The rotating structures 34 may be positioned in the interior 30 so that a bale placed into the hopper 12 contacts and at least partially rests upon some or all of the rotating structures 34. The rotating structures 34 may extend across the interior 30 of the hopper 12, and may be oriented substantially parallel to each other. The rotating structures 34 may be mounted on the side walls 28, 29 of the hopper. In some embodiments, at least two of the rotating structures 34 are positioned in a third plane (C), and the third plane may be different than the first (A) and second (B) planes of the respective top and bottom openings. The third plane may be located between the first and second planes, and may be located closer to the second plane of the bottom opening 20 than the first plane of the top opening 18. The third plane may be oriented substantially parallel to the second plane of the bottom opening 20. A first rotating structure 36 and a second rotating structure 38 may be oriented in the third plane, and the first rotating structure may be located toward the front 22 of the hopper 12 with the second rotating structure being located closer toward the rear 24 of the hopper 12.

At least one of the rotating structures 34, and in some embodiments two of the rotating structure, may be located outside of the third plane. A third rotating structure 40 may be located above the third plane, and may be located toward the rear 24 of the hopper, such as between the second rotating structure 38 and the rear wall 26. The third rotating structure 40 may be located at a vertical level that is higher than the third plane of the first 36 and second 38 rotating structures. In further embodiments, a fourth rotating structure 42 may be utilized. The fourth rotating structure 42 may be located toward the rear 24 of the hopper 12, and may be located toward the top 14 of the hopper. The fourth rotating structure 42 may be located rearwardly of the third rotating structure 40.

In various embodiments of the plurality of rotating structures 34, the rotating structures 34 rotate in different rotational directions. In some embodiments, two of the rotating structures of the rotating structures positioned in the third plane rotate in the same rotational direction, while at least one of the other rotational structures rotates in a different, opposite rotational direction. More specifically, in the illustrative embodiment, the first rotating structure 36 and the second rotating structure 38 both rotate in a first rotational direction, the third rotating structure 40 rotates in a second rotational direction, and the fourth rotating structure rotates in the first rotational direction. The rotation of the first 36, second 38 and fourth 42 rotating structures in the first rotational direction may cause the bale (particularly a round or cylindrically-shaped bale) to rotate in the hopper, and the rotation of the third rotating structure in a different, counter-rotating direction functions to pull material from the rotating bale.

Each, or at least one, of the rotating structures 34 may include a rotatable shaft 44, and the ends of the rotatable shaft may be rotatably mounted on the side walls 28, 29 of the hopper. The rotating structures 34 may also include a plurality of paddle elements 46 each mounted on the shaft 44 and extend radially outwardly from the shaft. The paddle elements may be arranged in a longitudinally-spaced array along a longitudinal axis of the rotatable shaft 44. The paddle elements 46 may have different radial orientations about the shaft, and in some embodiments, the paddle elements 46 are arranged in a helical array about the rotatable shaft (e.g., the positions of the elements 46 are arranged along an imaginary helical line extending about the rotating shaft. The individual paddle elements 46 may be mounted such that a plane of the element 46 is oriented askew to the longitudinal axis of the rotating shaft 44, and may also be oriented substantially perpendicular to an imaginary helical line connecting the paddle elements. The paddle elements 46 may have outer edges that are substantially uniformly thick, or may be sharpened to a thinner thickness.

The bale shredding assembly 32 may also include a drive system 50 for rotating the plurality of rotating structures 34 with respect to the hopper. The drive system 50 may include a motor 52 and one or more elements to transfer the rotation of the motor to the rotational structures 34. Suitable transfer elements may include, for example, pulleys and belts, chains and sprockets, gears, etc., or combinations thereof. In some embodiments, such as the embodiments illustrated in the drawings, the drive system 50 includes a main drive loop 52 (which may comprise a chain or belt or other suitable drive loop) that transmits rotational power between pulleys or sprockets mounted on the motor 52 and the various rotational structures 34. The main drive loop may connect the sprockets on the motor 52 and the second 38, third 40, and fourth 42 rotational structures (see FIG. 5). The main drive loop 52 may be arranged on the pulleys so that the second 38 and fourth 42 rotational structures are rotated in the first rotational direction, and the third rotational structure 40 is rotated in the second rotational direction. A secondary drive loop 54 may be employed to transmit the rotation from the second rotational structure 38 to the first rotational structure (see FIG. 5).

The apparatus 10 may also include a shield 60 mounted on the rear 24 of the hopper 12 which helps to guide the bale into the top opening 18 of the hopper and also to shield a vehicle from the bale when the apparatus 10 is mounted on the vehicle. The shield 60 may extend upwardly from the rear of the hopper 12, and may extend in a substantially vertically oriented plane when the hopper is rested on the ground surface. The shield 60 may be mounted on the rear wall 26 of the hopper 12, and may extend in a substantially coplanar manner with the rear wall. The shield 60 may include a perimeter frame 62 and a screen 64 that extends across the perimeter frame, although other configurations may be employed for the screen.

The bale processing apparatus 10 may also include a bale engaging assembly 66 for engaging a bale, such as when the bale is positioned on a ground surface and the apparatus is mounted on a vehicle and the apparatus 10 is tilted forwardly to bring the bale engaging assembly 66 downwardly toward the ground surface on which the bale rests. The bale may be scooped or otherwise lifted by the bale engaging assembly 66, and the bale may be readily moved from the bale engaging assembly 66 to interior 30 of the hopper 12, by rolling back the tilted apparatus 10 toward the vehicle, which is an operation easily accomplished when the vehicle is, for example, a loader. The bale engaging assembly 66 may be mounted on the hopper 12, and may be located on the front 22 of the hopper. The bale engaging assembly 66 may extend forwardly from the hopper 12, and may also extend in an upward direction from the hopper. The bale engaging assembly 66 may be positioned at a forward end of the top opening 18. The bale engaging assembly 66 may form a forward element of the hopper for defining the interior 30 of the hopper, and may be mounted on forward ends of the side walls 28, 29 of the hopper.

The bale engaging assembly 66 may comprise a plurality of tines 68, and the tines may be laterally spaced from each other. The plurality of tines 68 may be positioned substantially in the same plane, and may be oriented substantially parallel to each other. The tines 68 may each have a free end with a tip 70 located forwardly of the hopper. The tip 70 may be sharpened to some degree to permit easy spearing of a bale. The bale engaging apparatus 66 may further include one or more cross members 72 on which the tines 68 are mounted, and the cross member(s) may be mounted on the side walls 28, 39 of the hopper 12. The plane of the tines 68 may be inclined forwardly and upwardly at an angle of between approximately 30 degrees and approximately 60 degrees with respect to the ground surface when the hopper 12 is rested on the ground surface. Illustratively, the plane of the tines may be inclined forwardly and upwardly at an angle of approximately 45 degrees with respect to the ground surface when the hopper is rested on the ground surface.

Additionally, the bale processing apparatus 10 may include mounting structures for removably mounting the hopper on a vehicle, and may be located on the rear wall of the hopper 12. Such structures are known to those skilled in the art, and will vary with the type of vehicle on which the apparatus 10 is adapted to be mounted.

Significantly, the bale processing apparatus 10 may have a highly compact size due to the positioning of the top, inlet opening above the bottom, outlet opening to facilitate a relatively short and substantially vertically-oriented path for the movement of the material of the bale. The material of the bale is dispersed from the bottom of the hopper is a highly diffuse manner. The weight of the bale presses the bale into the bale shredding assembly 32 and into contact with the rotatable structures thereof.

In use, the bale processing apparatus 10 may be attached to a vehicle or other mobile base using suitable attachment means for the vehicle, and preferably (although not critically) the vehicles has arms on which the apparatus 10 may be mounted and that are capable of lifting the apparatus and tilting the apparatus about a transverse axis. A loader of the conventional or skid steer types having hydraulically actuated lift arms is one highly suitable example, although other vehicles may be used. The vehicle may be used to move the apparatus 10 to a location where a bale is situated on the ground surface or is stacked on other bales. The tines 68 of the bale engaging assembly 66 may be used to pick up the bale by spearing the bale and to position the bale in a desired location or orientation, or the apparatus 10 may be tilted forwardly to position the tines 68 below the bale and used to lift the bale by rolling back the apparatus 10 (and the tines 68). When the apparatus is in a level orientation (for example, with the second plane of the bottom opening being substantially horizontally oriented), the incline of the tines 68 will tend to roll or slide the bale toward the top opening of the hopper. Otherwise, if the bale remains resting on the tines when the apparatus is in the level orientation, the apparatus may be further rolled back from the level orientation to move the tines toward a more vertical orientation. Once the bale has moved into the top opening, the bale is brought into contact with the rotating structures 34 of the bale shredding assembly which are rotating to move the paddle elements with respect to the outer surface of the bale. The paddle elements tend to unroll the baled material, and scrape the outer surface of the baler and pull away the baled material from the body of the bale. The counter-rotation of at least one of the rotating structures helps to resist the bale from merely rolling on top of the rotating structures, and the fourth rotating structure tends to keep the movement of the other rotation structures from simply pushing the bale rearwardly against the rear wall. The material pulled from the bale is able to fall from the bale out through the bottom opening under the influence of gravity.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A bale processing apparatus for receiving and shredding a bale of material, the bale processing apparatus comprising:
   a hopper having a top and a bottom, a top opening through which a bale is received into the hopper and a bottom opening through which the material of the bale is dispersed, the bottom opening being at least partially positioned below the top opening; and
   a bale shredding assembly for removing material from a bale received in the hopper, the bale shredding assembly being located in an interior of the hopper below the top opening such that a bale dropped through the top opening into the hopper contacts the bale shredder assembly, and the bale shredding assembly being located above the bottom opening such that material removed from the bale by the bale shredding assembly falls through the bottom opening to a ground surface below the hopper;
   wherein the bale shredding assembly comprises a plurality of rotating structures, the plurality of rotating structures extending across the interior of the hopper between the top opening and the bottom opening;
   wherein each of the rotating structures includes:
      a rotatable shaft; and a plurality of paddle elements each mounted on the shaft and extending radially outwardly from the shaft.

2. The apparatus of claim 1 additionally comprising a bale engaging assembly for engaging a bale, the bale engaging assembly being mounted on the hopper and extending forwardly from a front of the hopper.

3. The apparatus of claim 2 wherein the bale engaging assembly extends in an upward direction and a forward direction from the hopper.

4. The apparatus of claim 2 wherein the bale engaging assembly comprises a plurality of laterally-spaced tines having free ends with tips located forwardly of the hopper.

5. The apparatus of claim 1 wherein at least two of the rotating structures are positioned in a plane oriented substantially parallel to a plane of the bottom opening.

6. The apparatus of claim 1 wherein at least one of the rotating shredding structures rotate in a first rotational direction, and wherein at least one rotating shredding structure counter-rotates in a second rotational direction.

7. The apparatus of claim 1 wherein the bale shredding assembly comprises a drive system configured to rotate the plurality of rotating structures.

8. The apparatus of claim 1 additionally comprising a shield mounted on the rear of the hopper, the shield extending upwardly from the rear of the hopper.

9. The apparatus of claim 1 wherein the bottom opening lies in a substantially horizontally oriented plane under the bale shredding assembly.

10. The apparatus of claim 1 wherein the rotating shredding structures are positioned in the interior of the hopper in a manner such that a bale placed in the hopper through the top opening rests substantially primarily upon the rotating shredding structures such that the bale is supported on the rotating shredding structures.

11. The apparatus of claim 1 wherein the housing is free of structure below the rotating shredding structures such that material removed by the rotating shredding structures falls freely downwardly in the substantially vertical direction without contacting structure before passing through the bottom opening.

12. A bale processing apparatus for receiving and shredding a bale of material, the bale processing apparatus comprising:
a hopper having a top and a bottom, a top opening through which a bale is received into the hopper and a bottom opening through which the material of the bale is dispersed, the bottom opening being at least partially positioned below the top opening; and
a bale shredding assembly for removing material from a bale received in the hopper, the bale shredding assembly being located in an interior of the hopper below the top opening such that a bale dropped through the top opening into the hopper contacts the bale shredder assembly, and the bale shredding assembly being located above the bottom opening such that material removed from the bale by the bale shredding assembly falls through the bottom opening to a ground surface below the hopper;
wherein the bale shredding assembly comprises a plurality of rotating structures, the plurality of rotating structures extending across the interior of the hopper between the top opening and the bottom opening;
wherein at least two of the rotating structures are positioned in a plane oriented substantially parallel to a plane of the bottom opening;
wherein at least one of the plurality of rotating structures is located outside of the plane of the at least two rotating structures.

13. The apparatus of claim 12 wherein the at least one rotating structure is located above the plane of the at least two rotating structures.

14. The apparatus of claim 12 wherein the at least one rotating structure is located rearwardly of the at least two rotating structures.

15. A bale processing apparatus for receiving and shredding a bale of material, the bale processing apparatus comprising:
a hopper having a top and a bottom, a top opening through which a bale is received into the hopper and a bottom opening through which the material of the bale is dispersed, the bottom opening being at least partially positioned below the top opening; and
a bale shredding assembly for removing material from a bale received in the hopper, the bale shredding assembly being located in an interior of the hopper below the top opening such that a bale dropped through the top opening into the hopper contacts the bale shredder assembly, and the bale shredding assembly being located above the bottom opening such that material removed from the bale by the bale shredding assembly falls through the bottom opening to a ground surface below the hopper;
wherein the top opening lies in a first plane and the bottom opening lies in a second plane, the first plane being inclined with respect to the second plane when the bottom of the hopper is rested upon a ground surface.

16. A bale processing apparatus for receiving and shredding a bale of material, the bale processing apparatus comprising:
a hopper having a top and a bottom, a top opening through which a bale is received into the hopper and a bottom opening through which the material of the bale is dispersed, the bottom opening being at least partially positioned below the top opening; and
a bale shredding assembly for removing material from a bale received in the hopper, the bale shredding assembly being located in an interior of the hopper below the top opening such that a bale dropped through the top opening into the hopper contacts the bale shredder assembly, and the bale shredding assembly being located above the bottom opening;
wherein the bale shredding assembly comprises a plurality of rotating shredding structures each configured to shred a bale that contacts the rotating shredding structure, the rotating shredding structures extending across the interior of the hopper; and
wherein the hopper has an open bottom forming the bottom opening so that material removed from the bale by the rotating shredding structures is free to fall downwardly in a substantially vertical path of movement from the rotating shredding structures to a ground surface below the hopper;
a bale engaging assembly for engaging a bale, the bale engaging assembly being mounted on the hopper and extending forwardly from a front of the hopper, the bale engaging assembly extending in an upward direction and a forward direction from the hopper, the bale engaging assembly comprising a plurality of laterally-spaced tines having free ends with tips located forwardly of the hopper;
at least two of the rotating shredding structures being positioned in a plane oriented substantially parallel to a plane of the bottom opening, at least one of the plurality of rotating shredding structures being located outside of the plane of the at least two rotating shredding structures, the at least one rotating shredding structure being located above the plane of the at least two rotating shredding structures, the at least one rotating shredding structure being located rearwardly of the at least two rotating shredding structures, at least one rotating shredding structure of the plurality of rotating shredding structure rotates in a first rotational direction and at least another of the plurality of rotating shredding structures counter-rotates in a second rotational direction, the at least two of the rotating shredding structures rotate in a first rotational direction, the at least one rotating shredding structure counter-rotating in a second rotational direction, wherein each of the rotating shredding structures includes:

a rotatable shaft; and a plurality of paddle elements each mounted on the shaft and extending radially outwardly from the shaft;

wherein the bale shredding assembly comprises a drive system configured to rotate the plurality of rotating bale shredding structures; and a shield mounted on the rear of the hopper, the shield extending upwardly from the rear of the hopper;

wherein the hopper tapers smaller from the top to the bottom, the top opening lying in a first plane and the top opening lies in a second plane, the first plane being inclined with respect to the second plane when the bottom of the hopper is rested upon a ground surface;

wherein the bale shredding assembly is located over the bottom opening so that the material shredded by the bale shredding assembly is free to fall out of the hopper to a ground surface below the hopper; and wherein bottom opening lies in a substantially horizontally oriented plane under the bale shredding assembly.

* * * * *